(12) United States Patent
Varis

(10) Patent No.: US 6,921,303 B2
(45) Date of Patent: Jul. 26, 2005

(54) MOTOR UNIT FOR A SHIP

(75) Inventor: Jukka Varis, Espoo (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 10/169,731

(22) PCT Filed: Jan. 26, 2001

(86) PCT No.: PCT/FI01/00076

§ 371 (c)(1),
(2), (4) Date: Nov. 14, 2002

(87) PCT Pub. No.: WO01/54972

PCT Pub. Date: Aug. 2, 2001

(65) Prior Publication Data

US 2003/0166362 A1 Sep. 4, 2003

(30) Foreign Application Priority Data

Jan. 28, 2000 (FI) .............................................. 20000191

(51) Int. Cl.⁷ ............................................. B60L 11/02
(52) U.S. Cl. ......................................................... 440/6
(58) Field of Search ........................................ 440/6, 5

(56) References Cited

U.S. PATENT DOCUMENTS

| | | | | |
|---|---|---|---|---|
| 2,824,984 A | | 2/1958 | Harris ........................... 310/87 |
| 2,834,313 A | * | 5/1958 | Frohlich ......................... 440/6 |
| 3,954,081 A | * | 5/1976 | Blake ............................. 440/6 |
| 4,311,470 A | * | 1/1982 | Blanchard ...................... 440/6 |
| 5,101,128 A | * | 3/1992 | Veronesi et al. ............... 310/54 |
| 5,417,597 A | | 5/1995 | Levedahl ........................ 440/6 |
| 5,445,545 A | | 8/1995 | Draper ........................... 440/6 |
| 5,947,779 A | * | 9/1999 | Heideman et al. ............. 440/6 |
| 6,152,791 A | * | 11/2000 | Sinko et al. ................... 440/6 |

FOREIGN PATENT DOCUMENTS

| | | |
|---|---|---|
| DE | 298 23 993 U1 | 8/2000 |
| EP | 0 590 867 A1 | 4/1994 |
| EP | 0 816 222 A2 | 1/1998 |
| EP | 0 831 026 A2 | 3/1998 |
| EP | 1 022 215 A2 | 7/2000 |
| FI | 76977 | 8/1988 |
| FI | 973372 | 2/1998 |

* cited by examiner

Primary Examiner—Sherman Basinger
(74) Attorney, Agent, or Firm—Arent Fox, PLLC

(57) ABSTRACT

A propulsion unit for a ship including a motor housing, which is arranged in the water and contains a motor and a control unit. A propeller is arranged at a motor shaft. The motor housing is arranged as a separate modular motor unit, which can be attached to the ship by way of a fastening arrangement.

13 Claims, 4 Drawing Sheets

MOTOR UNIT FOR A SHIP

CROSS-REFERENCE TO RELATED APPLICATION

This application is a National Stage entry of International Application No. PCT/FI01/00076, filed Jan. 26, 2001, the entire specification, claims and drawings of which are incorporated herewith by reference.

BACKGROUND OF THE INVENTION

1. Field of the Invention

The present invention relates to a propulsion unit arrangement for a ship, the arrangement including a motor housing in the water, a motor located in the housing, associated control devices as well as a propeller arranged at the motor's shaft.

2. Description of the Related Art

A conventional motor arrangement for a ship comprises a motor arranged within the ship's hull and a propeller arranged on the end of a motor shaft which extends in a watertight manner through the ship's hull. As the propeller rotates it brings water surrounding the ship into motion and thus creates a reaction force which thrusts the ship forwards. The motor can be a directly employed diesel engine or like combustion engine or, favorably, an electric motor to which necessary electric power is supplied by a conventional combustion engine, a gas turbine, a nuclear power plant or the like. The steering of such ships is conventionally arranged so that a pivoting rudder is provided in the propeller's wake, the rudder deflecting the wake and thus creating a lateral force component in relation to the longitudinal direction of the ship.

Other types of so-called propulsion units are also known, wherein the propeller as such can be pivoted for the purpose of steering the ship. This pivoting motion can be accomplished by means of a rather complicated shaft arrangement, or in such a way that the propeller is arranged at the shaft of a motor which, as such, is arranged to be rotatable around a vertical axis. This latter arrangement is called an azimuthing propulsion device. Such a device is described in, for example, the applicant's Finnish Patent No. 76977, which is being marketed by the applicant under the trademark AZIPOD.

Until now all arrangements implemented for ships have the feature in common that the motors per se, as well as other devices and means, are adapted to constitute an essentially integral part of the ship right from the stage of building the ship. Thus, any thorough repair or replacement of the motor can hardly take place unless the ship is docked, after which substantial portions of the ship are dismantled for enabling the replacement to be done. Thus, the only repair job that is somewhat simply and easily accomplished, is usually the task of replacing a damaged propeller, whilst it always will take a long time indeed to perform other, more extensive repairs.

A further disadvantage of motor arrangements which are implemented separately for each ship is that since a motor is being built separately for each ship in any case, the number of motor alternatives tends to increase, and thus full advantage cannot be taken of long serials. The production costs are affected in an unfavorable manner by the complexity of such arrangements and short serials.

SUMMARY OF THE INVENTION

An arrangement according to the present invention has been developed in order to eliminate these disadvantages and other ones caused by multiformity, the characteristic features of which arrangement are disclosed in the appended claims. Thus, the general arrangement according to the present invention is characterized in that the ship's propulsion arrangements include a separate motor housing which is arranged to form such a separate modular motor unit which can be attached to the ship by means of fastening means.

A multitude of significant advantages are achieved by using such a modular arrangement, particularly in connection with the aforementioned azimuthing propulsion system, which advantages are presented below in more detail with reference to different embodiments of the present invention. In the specification, exemplifying references are made to the attached drawings, wherein:

DETAILED DESCRIPTION OF THE INVENTION

Figure 1:
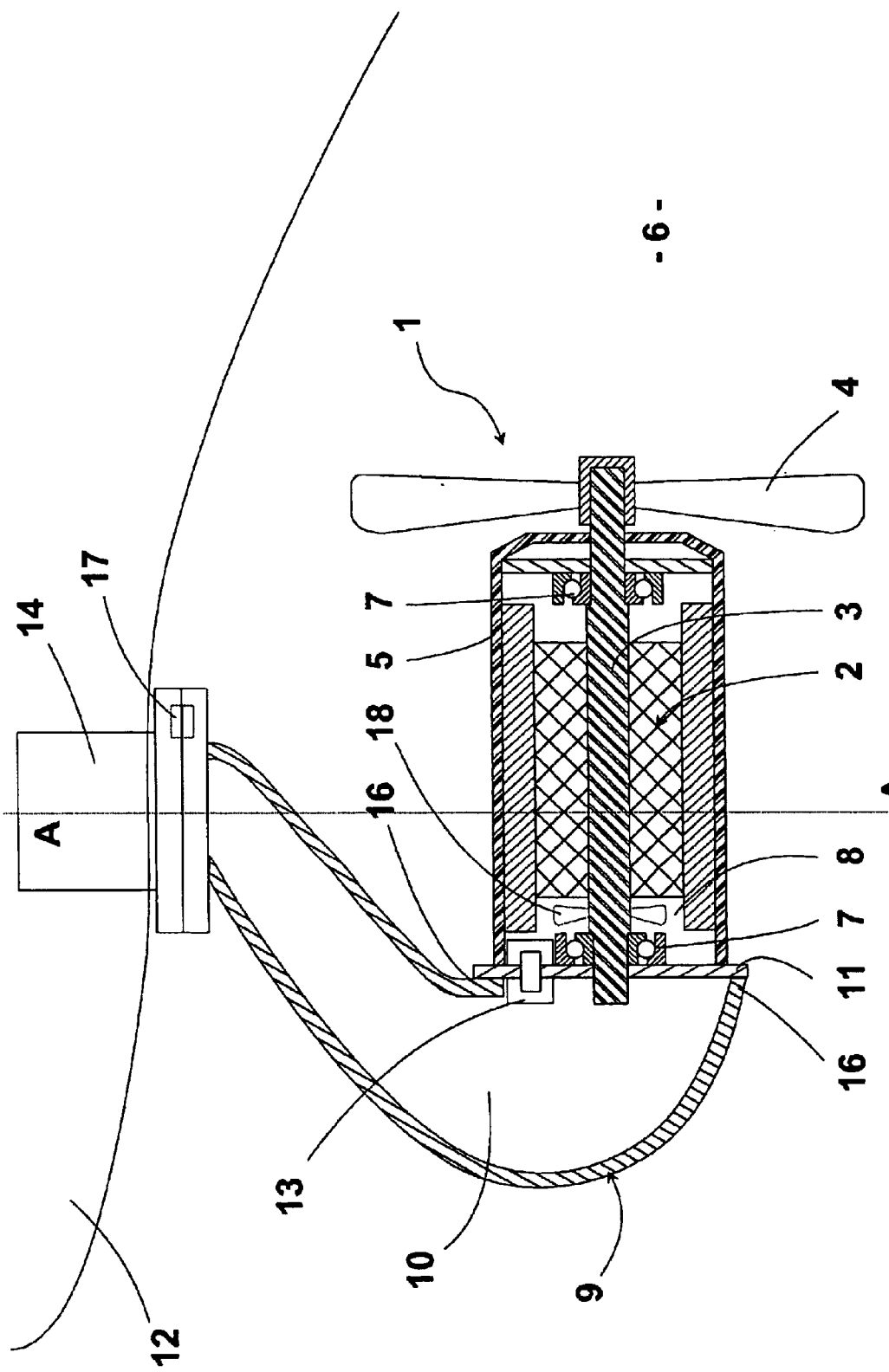
FIG. 1 as a schematic section discloses an example of an embodiment of a modular motor arrangement in connection with an azimuthing propulsion system, FIG. 2 in a corresponding manner discloses a favorable embodiment of a modular motor unit, the embodiment comprising two essentially identical motor units, FIG. 3 a corresponding manner discloses a solution wherein a modular motor unit according to the present invention is arranged as a fixed propulsion means in the stern of a ship, thus replacing a conventional propeller arrangement, and FIG. 4 discloses a solution wherein a motor unit is installed in such a manner, that the propeller shaft is aligned off the horizontal.

Referring to FIG. 1, a modular motor unit 1 according to the present invention generally comprises an electric motor 2 having a shaft 3 provided with a propeller 4. An outer casing of the motor unit is favorably arranged so that the motor 2 gets its cooling directly through the casing 5 from the surrounding water 6, as explained in more detail in a copending patent application. Thus, the motor unit 1, as such, constitutes such a structural part of the ship which is in direct contact with water, wherein the outer casing 5 of the motor unit 1 at the same time serves as the ship's hull at the location of the motor 2, or can be compared to such a hull.

The motor shaft 3 is mounted in bearings 7 in both ends of the motor in a manner known per se, in connection with which bearings gaskets, known per se, are suitably arranged so that the interior 8 of the motor favorably is fully isolated from the surrounding water 6 and suitably also from the interior 10 of a mounting assembly 9.

Figure 3:
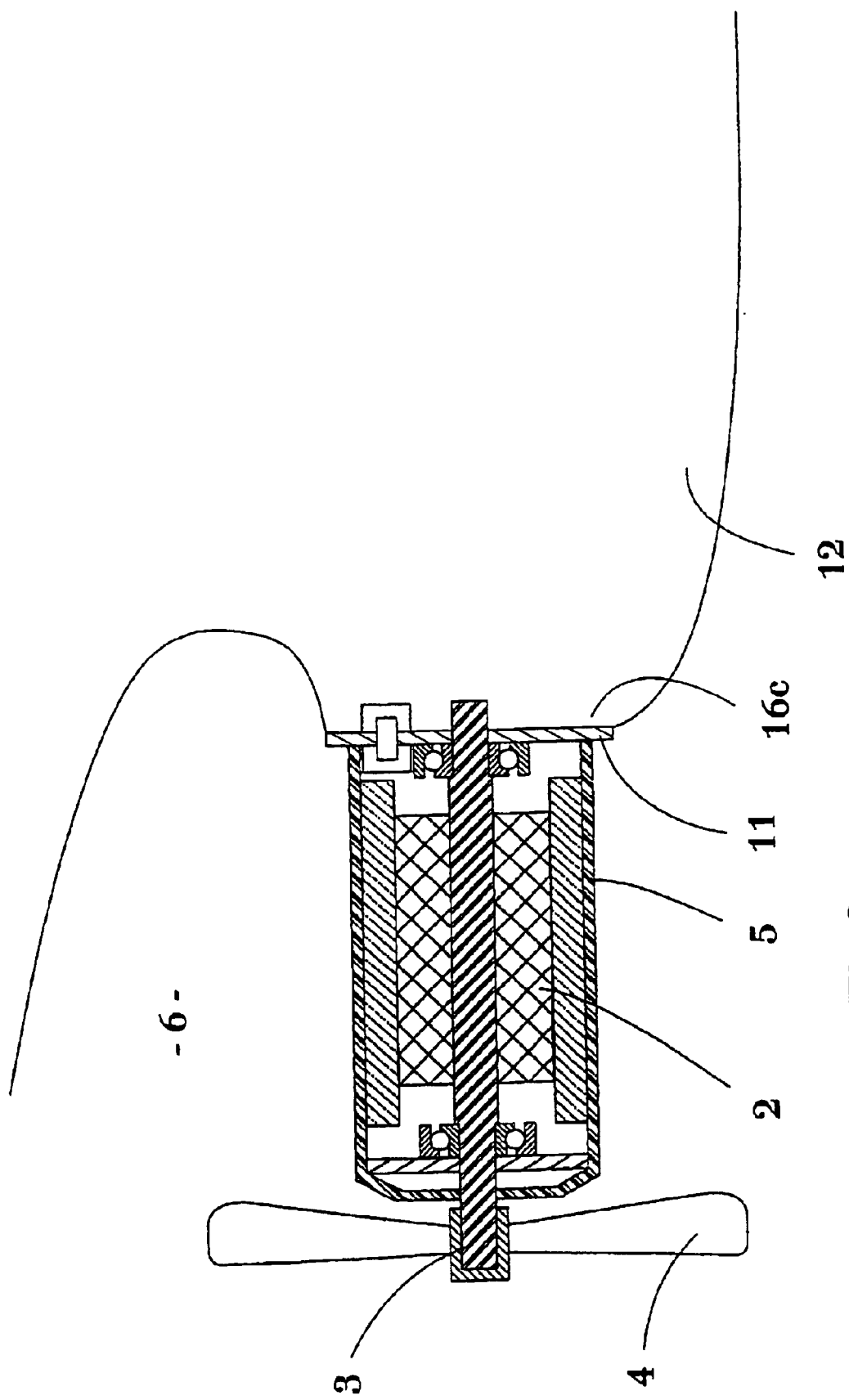

The motor unit includes fastening means, suitably in the form of a flange 11, by which the motor unit can be attached to corresponding flange means 16, 16a, 16b arranged on the mounting assembly 9, or in the case according to FIG. 3 directly to means 16c arranged at the ship's hull 12. The modular motor unit 1, as such, constitutes a kind of extension of the mounting assembly 9, extending into the water, i.e. mainly such a part of the propulsion device which in the art usually is called a "pod" when it is located at the end of a rotatable arm. In order to render the attachment as effective as possible FIG. 1 shows schematically using reference number 13, that connections to the motor 2, such as a power supply, control and monitoring means, any lubricating and/or cooling means etc., preferably are connected via a central connector to mounting assembly 10 or to the ship's hull 12, respectively. Further, a slip-ring 17 can be used to convey the motor's power supply or control functions to the motor units 1, 1a.

Several considerable advantages are achieved by a general arrangement according to the present invention. Firstly, the motor unit can be given an extremely compact design. Since the device in question to a large extent is a standard set-up, which as such is applicable to a multitude of uses, the motor unit 2, which in itself contains even complex technology, can be produced in long series without any significant consideration of the final use. This also ensures that the supply of spare parts for the motor unit can be very extensive, to start with having complete units as such available as goods in stock at the most important shipyards or even carried on board the ship.

Due to its compact design the arrangement according to the present invention provides a significantly smaller cross section in the flow direction, compared to present ones, which provides better propulsion efficiency with a smaller propeller. It is also usually possible to use smaller bearings 7. One important advantage is also the fact that it is easy to implement redundancy.

From the aspects of product delivery and maintenance, the arrangement according to the present invention enables rapid production and shorter stock turnover time. Maintenance is fast and simple due to inter-changeability and standard models, which is a significant advantage considering the fact, that ship delays for maintenance or repair can become extremely expensive.

Favorably, the arrangement disclosed in FIG. 1 functionally represents the azimuthing propulsion system described above, i.e., the whole assembly 9 is rotatable around a vertical axis A—A. Thus, the assembly including the motor replaces the propeller-rudder assembly of more old-fashioned technology and, among other things, provides clearly better efficiency and improved turning characteristics compared to that. The assembly 9 in the embodiment according to FIG. 1 comprises a preferably essentially hollow and suitably at least to some extent, a curved body part attached by flanges to arrangements for turning, such as a turning gear, a power supply, and control, which are known per se in the art, and which are referred to only allusively by reference number 14. Due to the curved mounting assembly the whole device turns in an optimal way in a similar manner as the azimuthing propulsion devices known thus far.

Cooling directly through the outer casing 5 of the motor unit 1, as implemented according to a co-pending patent application, can be implemented particularly well by the arrangement according to the present invention, wherein a symmetry required for balanced cooling is easily achieved. Due to the modular structure, there are no such external parts of the unit which would cause discontinuance locations in regard to cooling. Thus access is provided everywhere for the surrounding water 6 to act as a coolant. The modular motor unit 1, 1a is provided with fan 18 for setting in motion the surrounding water 6 inside the modular motor unit 1, 1a in order to enhance a heat transfer between the modular motor 2, 2a and the surrounding water 6 located outside the unit. Along with the arrangement a conventional air-cooling including ducts and special arrangements can be omitted. Thus, production of the motor unit is facilitated and speeded up, and the weight of the unit will be small, and thus the size of any production equipment required for the production of the unit can be reduced as well.

Figure 2:
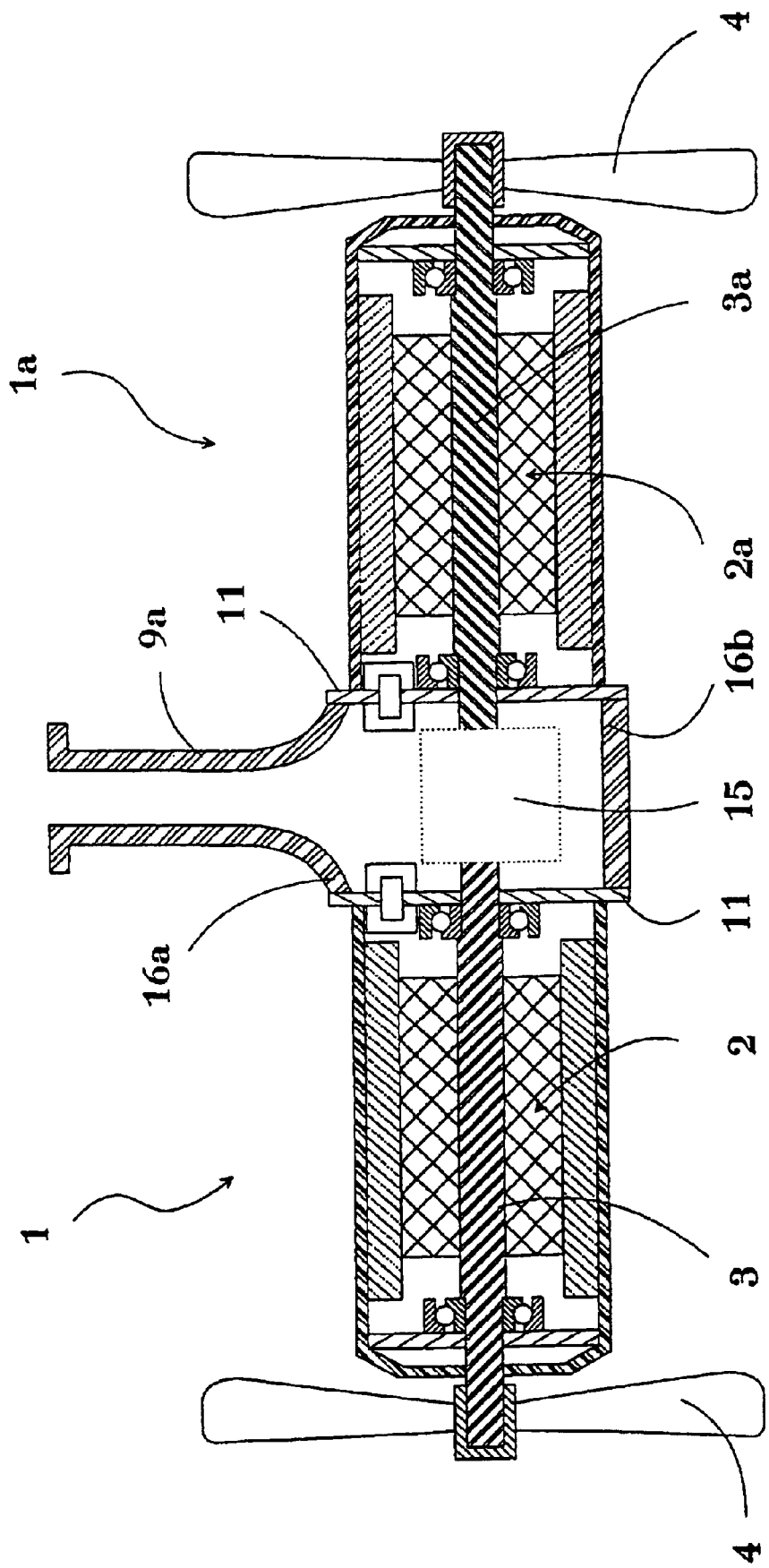

A particularly favorable solution is presented in FIG. 2, wherein two modular motor units 1 and 1a are attached to a common rotatable assembly 9a. These motor units 1 and 1a can each have a separate power supply or a common one. According to one embodiment the two motors 2 and 2a in tandem can, if necessary, further be mechanically interconnected by a clutch generally referred to as 15. Alternatively, the motors 1 and 1a also can be operated in opposite directions. Thus, the arrangement here offers the possibility of both a common control of the two motors 2, 2a as well as individual control so that each motor is driven on controls of its own.

In the embodiments in FIGS. 1 and 2 described above, as well as in the one in FIG. 4 to be discussed later, the motor units 1, 1a according to the present invention are attached to rotatable arm assemblies to provide an azimuthing propulsion system. FIG. 3, on the other hand, discloses a solution where a modular motor unit 1 according to the present invention is attached directly to the ship's 12 hull, thus replacing a conventional propeller assembly. Also, in this case, a considerable number of the advantages offered by the modular structure can be achieved.

Figure 4:
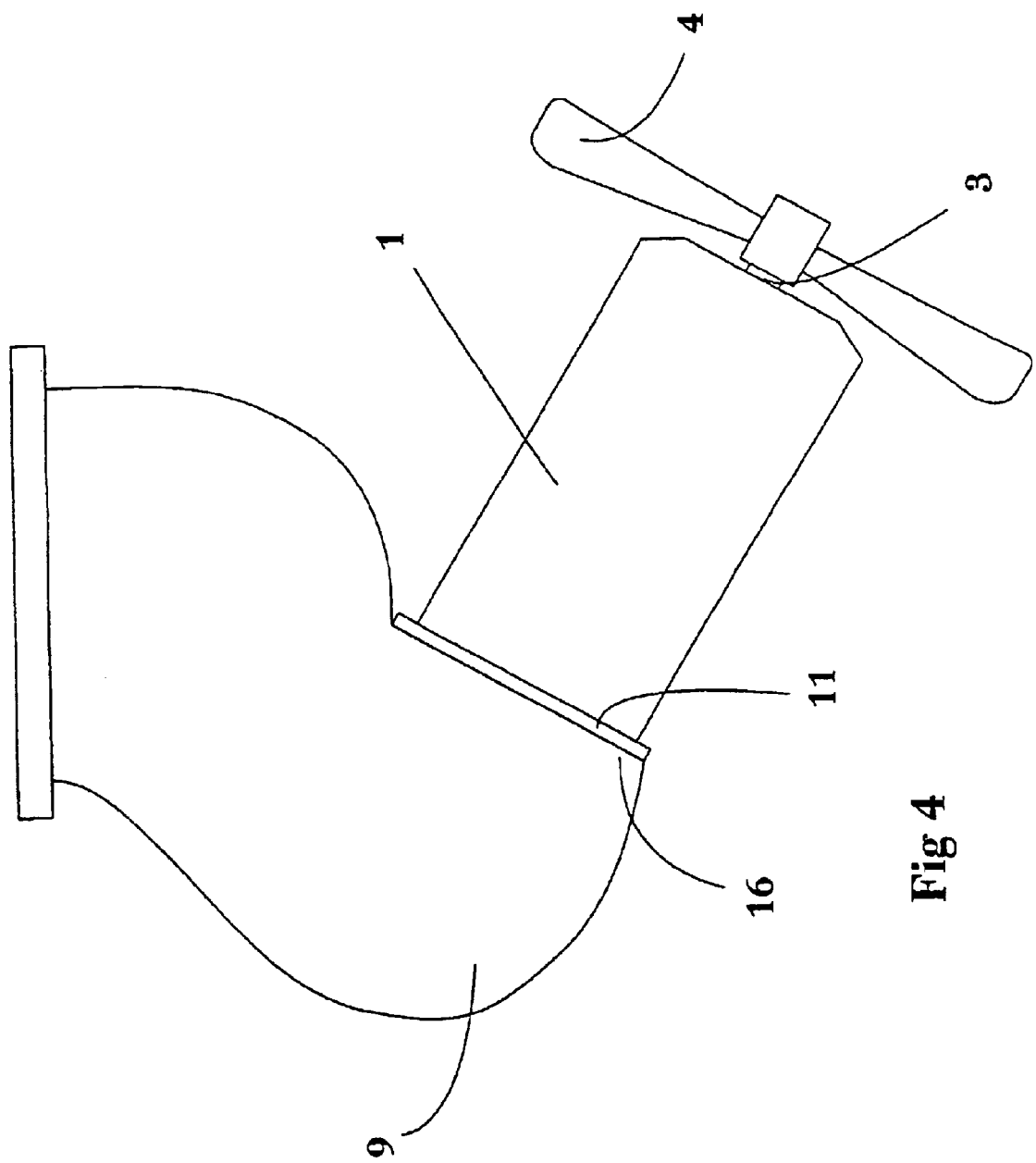

Finally, FIG. 4 shows that a modular motor unit according to the present invention in some special applications can also be mounted so that the direction of the motor shaft differs from the horizontal.

Above, some favorable embodiments of the present invention have been disclosed by way of example, but for a person skilled in the art it will be clear that the invention is not limited to those alone, but that it can be modified in many different ways within the scope of the appended claims.

What is claimed is:

1. A propulsion unit arrangement for a ship, said arrangement including at least one motor housing as well as a motor arranged therein, and further including control devices related thereto and a propeller arranged at one outermost end of a motor shaft wherein said at least one motor housing is arranged as a separate modular motor unit which is attached as an entity to a supporting system arranged at said ship by means of fastening means which are arranged at an end of said modular motor unit which is opposite to said propeller and which include flange means, wherein said supporting system comprises a rotatable assembly attached to the ship through the ship'bottom and wherein said assembly at an upper end thereof includes a turning near for turning the assembly in connection with steering the ship, said supporting system further including means for conveying power supply or control functions to at least one separate modular motor unit arranged at said assembly.

2. The arrangement according to claim 1, wherein said assembly comprises an essentially curved supporting beam having said flange means at one end for attaching said at least one separate modular motor unit to said assembly.

3. The arrangement according to claim 1, wherein said assembly comprises an essentially vertical central body and a plurality of flange means arranged on the assembly.

4. The arrangement according to claim 3, wherein at least two of the plurality of flange means are opposite one another, and at least one separate modular motor unit is operatively attachable so that said shafts of said motors are locatable in a common horizontal plane and said shafts are clutched to each other.

5. The arrangement according to claim 1, wherein said flange means of said assembly are arranged so that the at least one separate modular motor unit's propeller shaft extends essentially horizontally.

6. The arrangement according to claim 1, wherein said flange means of said assembly are arranged so that the propeller shaft of the at least one separate modular motor unit extends in a direction which differs from the horizontal direction.

7. The arrangement according to claim 1, wherein at least one separate modular motor unit is cooled through a casing structure of the unit directly to a medium located outside said uni.

8. The arrangement according to claim 7, wherein said at least one separate modular motor unit is provided with additional means for setting in motion a medium inside said at least one separate modular motor unit in order to enhance a heat transfer between said at least one separate modular motor and said medium located outside said unit.

9. The arrangement as in claim 1, wherein said means for conveying the power supply of the motor or control functions to said at least one separate modular motor unit comprises slip ring means.

10. A propulsion unit arrangement for a ship comprising: at least one modular motor housing; at least one flange connectable to the at least one modular motor housing and to a hull of a ship; a motor disposed in the at least one modular motor housing; a plurality of control devices operatively connected to the ship and the at least one modular motor housing through a mounting assembly or hull of the ship; and a motor shaft arranged in the at least one modular motor housing connected to a propeller, wherein the at least one flange is arranged at said housing at a front end axially opposite to said propeller, wherein a supporting arrangement connected to the ship comprises a supporting beam member attached to a bottom of the ship and including a tuning gear so that the supporting beam member is rotatable, said supporting beam member including connecting means for conveying control and power functions to the at least one modular motor housing, and having at least one flange at one end for attaching the at least one motor housing unit to the support member.

11. The arrangement according to claim 10, wherein the supporting beam member is curved.

12. The arrangement according to claim 10, wherein the support member comprises a vertical central body and a plurality of flanges arranged on the vertical central body, and at least two of the plurality of flanges are attachable to at least two modular motor housings so that a first shaft of a first motor and a second shaft of a second motor are positioned in a horizontal plane and the first shaft and the second shaft are clutched together.

13. The arrangement according to claim 10, wherein the at least one flange is arranged so that a shaft of the at least one modular motor housing extends in a direction other than a horizontal direction.

* * * * *

UNITED STATES PATENT AND TRADEMARK OFFICE
CERTIFICATE OF CORRECTION

PATENT NO. : 6,921,303 B2
DATED : July 26, 2005
INVENTOR(S) : Jukka Varis

Page 1 of 1

It is certified that error appears in the above-identified patent and that said Letters Patent is hereby corrected as shown below:

Column 4,
Line 44, delete "near" and substitute -- gear --.

Signed and Sealed this

Eleventh Day of April, 2006

JON W. DUDAS
*Director of the United States Patent and Trademark Office*